United States Patent [19]

Karning et al.

[11] Patent Number: 4,499,582
[45] Date of Patent: Feb. 12, 1985

[54] LASER SYSTEM

[76] Inventors: Heinrich Karning, Albert-Fritz-Str. 6, 6900 Heidelberg; Franz Prein, Tulpenweg 3, 6901 Waldhilsbach; Karl-Heinz Vierling, Joh.-Seb.-Bach-Str. 46, 6901 Bammental, all of Fed. Rep. of Germany

[21] Appl. No.: 329,267
[22] PCT Filed: Jan. 24, 1981
[86] PCT No.: PCT/DE81/00021
§ 371 Date: Dec. 4, 1981
§ 102(e) Date: Dec. 4, 1981
[87] PCT Pub. No.: WO81/02952
PCT Pub. Date: Oct. 15, 1981

[30] Foreign Application Priority Data

Apr. 5, 1980 [DE] Fed. Rep. of Germany ....... 3013300
Apr. 5, 1980 [DE] Fed. Rep. of Germany ....... 3013301

[51] Int. Cl.$^3$ .............................................. H01S 3/081
[52] U.S. Cl. ........................................ 372/93; 372/97; 372/95; 372/87; 372/107; 372/108; 372/23; 372/55
[58] Field of Search ............................... 372/97, 92–95, 372/87, 55, 107, 108, 25, 83, 61, 101, 23

[56] References Cited

FOREIGN PATENT DOCUMENTS

| 1032 | 4/1979 | European Pat. Off. .............. 372/83 |
| 11679 | 6/1980 | European Pat. Off. .............. 372/83 |
| 2737226 | 2/1979 | Fed. Rep. of Germany ........ 372/83 |
| 2035674 | 6/1980 | United Kingdom .................. 372/83 |

Primary Examiner—William L. Sikes
Assistant Examiner—Léon Scott, Jr.
Attorney, Agent, or Firm—Handal & Morofsky

[57] ABSTRACT

A laser system with a folded beam path is disclosed. The beam path is formed by a plurality of mirrors (18–21). Mirrors (18–21) reflect light in a closed loop from one mirror to the other. Electrodes are disposed on opposite sides of the path between the mirrors and form channels through which the path extends. In addition to serving to direct the beam in a closed loop, one of the mirrors may have the characteristic of reflecting one wavelength of light with a reflectivity of 100% while reflecting other wavelengths of light with a reflectivity of only 85%, such mirror thus acting to pass the other wavelength of light while completely reflecting the one wavelength of light. In one of the disclosed embodiments, four wavelengths of light are directed in a loop comprising mirrors 85% reflective to a wavelength while otherwise 100% reflective which promotes ring laser operations with respect to other wavelengths without passing such other wavelengths. This utilization of the active medium results in a rapid rise time and, if the laser is embodied as an unstable resonator, results in satisfactory energy yield in single mode operation. If the endfaces (8, 9) of the housing (2) enclosing the laser system are embodied, in the appropriate places, as totally and/or partially reflecting surfaces, problems of adjustment are eliminated. Pulse shape (25) can be influenced by element (27), disposed in the coupled-out region of the laser beam (17'), which may be an active optical switch or a passive Q-switch.

20 Claims, 9 Drawing Figures

LASER SYSTEM

The invention relates to a laser system consisting of a housing surrounding a resonator chamber and including an electrode assembly comprising a center electrode with at least two surfaces serving for electrical discharge and at least two outer electrodes opposite the first electrodes. At the end faces of the housing, at the level of the space between the electrodes, there are provided optical elements that are either reflective to return the laser beam in the opposite direction and/or are at least partially transmitting to permit coupling the laser beam out of the cavity. The beam-deviating elements are disposed at some angle relative to the beam direction.

A laser system of this kind is described, for example, in the W. German Offenlegungsschrift No. 27 533 304. In principle, any of the optical elements, if suitably constructed, can be used for coupling out the laser beam. If the optical element is embodied as a wavelength-selecting mirror, each mirror can couple out laser beams of different wavelength. The preferred construction, however, is a ring laser, i.e., an unstable resonator having only one exit mirror, as described in the Journal of Applied Physics, Vol. 42, Number 8, July 1971, pages 3133 to 3137, entitled "$CO_2$ regenerative ring power amplifiers" by C. B. Buczek. R. J. Freiberg and M. L. Skolnick. Other details regarding ring lasers are to be found in the article "Der Ring Laserein neues Konzept fuer Farbstofflaser" by Günter Hummelt, which appeared in the technical journal ELEKTRONIK, 1978, issue 12, pages 85 ff. An oscillator laser amplifier is described in "Applied Physics Letters, Vol. 24, No 7, Apr. 1, 1974, pages 306–307, and in the article "Generation of bandwidth-limited pulses from a TEA $CO_2$ laser using p-type germanium", by A. F. Gibson, M. F. Kimmitt and B. Norris.

The object of the invention lies in improving the power output of the generic laser for at least one wavelength. This object is attained, according to the invention, in that all four optical elements deviate the laser beam in the manner of a ring laser in the direction of the opposite optical element by suitable mutual disposition of obliquely placed surfaces. The favorable utilization of the active medium makes possible a rapid increase of amplification. When the laser is embodied as a unstable resonator, the energy yield in single mode ooperation is high, i.e, the efficiency is high. While the disposition of the optical elements at 45° to the beam direction is standard, thereby giving the overall beam path a rectangular shape, other angles are possible in principle if the mechanism for coupling out the beam should make that necessary. For example, it is possible that diagonally opposite optical elements are so placed as to subtend the same angle relative to the laser beam.

A further embodiment of the invention provides, for use with two or more wavelengths and with suitably partitioned electrodes, for the optical elements to be pivotable about an axis perpendicular to the horizontal main apparatus plane such that each of the free spaces between the electrodes is associated with a different wavelength. In this way, one obtains a two-wave or multiple-wave laser with synchronously generated wavetrains. The partitioning of the electrodes is understood to mean that, by reducing the width of the electrodes while keeping the discharge volume constant, the resonator volume can be subdivided into any desired number of mutually parallel beam paths, keeping the overall beam power constant. The simplest kind of partitioning is that of two beam paths created by a central electrode and two opposing outer electrodes having two effective surfaces. Such a partition as well as more complicated ones are described in the afore-mentioned Offenlegungsschrift. If the wavelengths are far apart, it may be useful, in the present context, to embody the surfaces of the optical elements associated with the various wavelengths as diffraction gratings with different grating constants.

In order to correct or homogenize any inhomogenous energy distribution in the beam, the optical elements are made exchangeable and their surfaces are suitably other than planar, depending on the circumstances, e.g., cylindrical or aspheric. As a rule, the shape of the optical surfaces cannot be predicted but each one can be chosen with deliberation and tested in the system prior to selection. The system might be used, for example, in a laser in which a part of the beam is being coupled out and is tested for its optical quality, i.e., for the homogeneity of energy distribution, and then adjusted by means of adaptive optical elements. This process can also be automated.

Another embodiment of the invention provides that the two endfaces of the housing are themselves totally and/or partially reflecting carrier plates which may consist of quartz, glass, glass-ceramic, germanium, cadmium telluride or zinc selenide. Such a coupling of mirrors is only slightly subject to temperature changes and need not be adjusted internally. In such a system, the side of the carrier plate facing the resonator should have at least one totally reflecting region and one sufficiently transmitting region. If necessary, the carrier plate may be embodied as a mode selector. This brings the advantage of saving an otherwise necessary beam-limiting element. Total or partial transmission requires a suitable Q-value. In practice, it has been found to be advantageous to create the totally reflecting region by vapor deposition of a layer of metal (gold) or dielectric material and to select a transparent material for the transmitting portion or at least to replace the latter with a tunnel. A plate equipped with mutually fixed optical surfaces is also usable for other lasers such as solid state lasers, pulsed gas lasers, continuous wave lasers, etc., and protection is also being sought therefor.

Totally reflecting mirrors located on the same side of the system can be replaced by a prism block or a triple mirror. In the case of a triple mirror, it is advantageous if its surfaces are exposed to the beam and its ridges are outside of the beam. In order to tune the resonator length, it is useful to provide for a piezoelectric drive to adjust the optical elements and/or the endplates on which they are mounted. The direction of adjustment is always perpendicular to the plane of the elements or of the sides.

Another characteristic of the invention is to provide for the disposition of a common optical crystal, for example, germanium or cadmium telluride, in the path of two extracted beams of different wavelength, $\lambda_1$ and $\lambda_2$, if required to produce a further beam at the different wavelength $\lambda_3$.

In order to influence the form of the laser pulse in a laser having at least two channels, it is suitable to place the channels formed by the electrode pairs in optical series by guiding the beam from one channel into the other channel and to place at least one element for influencing the beam formation in the path, for either temporal and/or spatial influence. This is a simple way to control the beam processing so that the pulse formed at the exit of the second channel has the desired shape. A preferred embodiment for this purpose places the pulse-shaping element in the region between the two channels so that the beam is affected prior to entering the second channel.

In practice, it is useful if the first channel has an optically closed laser oscillator with an (unstable) resonator and the second, series-connected discharge laser represents a laser amplifier with an injection laser. This construction makes it possible to use the effective element for temporal or geometric selection and to couple the beam into the amplifier at the time of optimum amplification or in such a way as to utilize only the most favorable region of the amplifying medium. In this application, it may be useful to use laser oscillators and amplifiers that operate at different temperatures, pressures and with different gas mixtures and in which the pumping may be chosen to occur at given times and independently of one another.

It is also suitable, in that case, to equip the endfaces of the housing of the first channel with Brewster angle windows and/or a totally reflecting and an at least partially transmissive optical element and to place a Brewster angle window on each one of the end faces of the housing of the further channel connected in series with the first channel.

Suitably, the element that influences the temporal aspect of pulse generation is an optically active switch (Q-switch) or a passive Q-switch. In the active case, one may use, for example, an electro-optical crystal, e.g., cadmium telluride, or an acousto-optical crystal and, in the passive case, one may use a saturable absorber, for example germanium or $SF_6$ or hot $CO_2$. Of course, other active or passive Q-switches, not cited here, may also be used.

Another advantage of the invention is seen in that use may be made of an element for influencing the geometry of the pulse formation by focussing, rotating or polarizing. This element can be placed within or without the overall housing. It is also possible to use adaptive optical elements to change the phase surfaces.

A number of embodiments of the invention will be described in detail with the aid of the drawing, in which similar parts carry the same reference characters.

Figure 1:
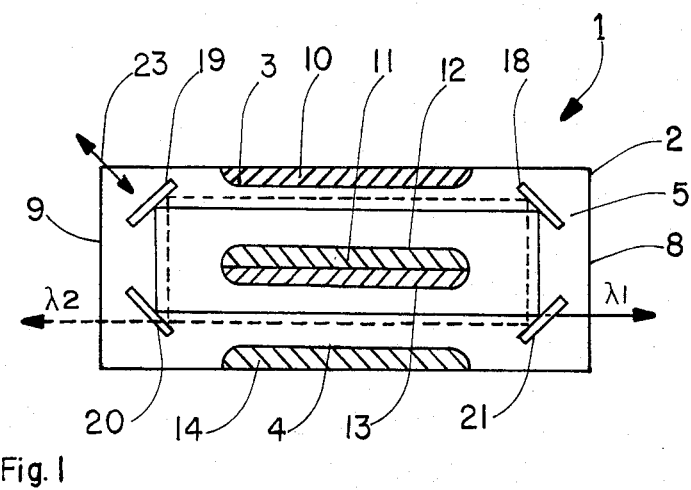
FIG. 1 is a longitudinal crossection through a ring laser with two beam paths, deviating means disposed at 45° thereto and two extraction points.

The basic arrangement of the system in FIG. 1 shows the laser 1 having a housing 2 surrounding the resonator or discharge volume 5 and enclosing the electrode system 10–14. The two endfaces 8 and 9 of the housing serve mostly to hold the mirrors 17–21. The system of electrodes 10–14 has an external voltage supply lead and consists of the central electrode 11 located on the longitudinal axis of the housing 2 and having an outer contour that defines two oppositely directed discharge surfaces 12 and 13, each of which cooperates with an associated opposite electrode 10 and 14 located inside the housing along the longitudinal wall, with discharge surfaces 3 and 4, respectively.

Figure 3:
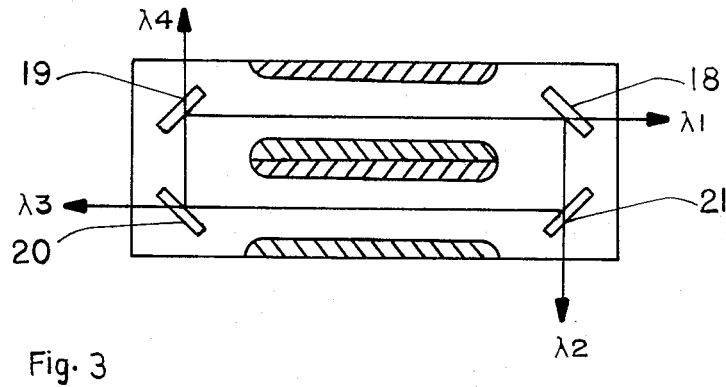
FIG. 3 shows a ring laser according to FIG. 1 with four beam paths and the same number of extraction points.

The three totally reflecting elements 18–20, for example, mirrors, and the partially transmissive optical element 21, possibly another, suitably constructed mirror, are disposed at the end faces 8 and 9 at the level of the free spaces between the electrodes, all for the case of a beam of wavelength $\lambda_1$ as shown in solid lines. The surfaces of the mirrors face one another and make an angle of 45° with the beam path. When the gas in the resonator chamber is excited, the emissions constitute a ring laser whose radiation is coupled out through the partially transmitting mirror 21. If a ring laser with two wavelengths $\lambda_1$ and $\lambda_2$ is used, another totally reflecting mirror, for example mirror 20, must be replaced by a partially transmitting mirror. An example of a laser with four different extractable wavelengths $\lambda_1$ and $\lambda_4$ is illustrated in FIG. 3. In this case, transmission is set at 85% and reflection at 15%. Of course, these percentages of transmission and reflection can be changed for other embodiments and could even be different for any of the four optical elements of the example shown.

Figure 2:
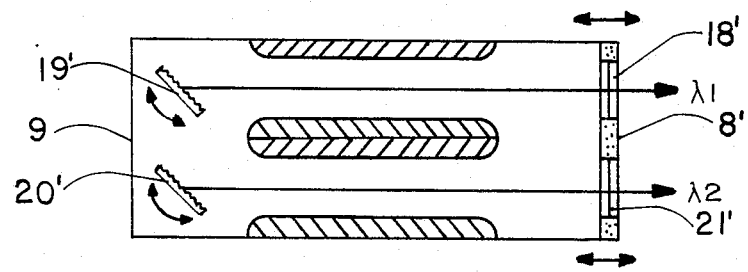
FIG. 2 is a longitudinal section through a laser with one wavelength per beam path.

FIG. 2 shows an embodiment in which the mirrors 19' and 20', including their associated gratings, are rotatable in the direction of the double arrows. As shown, the mirror 19' has been turned by approx. 45° so that the mirrors 19' and 20' now only reflect along parallel lines, in the longitudinal direction of the housing 2, toward the associated transparent or partially transparent mirrors 18' and 21' which may be moved in the direction of the double arrows and can replace the wall at this location. This construction permits an adjustment of the length of the laser and operation of the laser with two synchronous pulses of wavelengths $\lambda_1$ and $\lambda_2$, extracted separately by mirrors 18' and 21', respectively. Other wavelength-selective optical elements, for example, prisms, could be used instead of the gratings. The grating constants corresponding to the mirrors associated with different wavelengths can be different. The displacement of the optical elements and/or the sidewall on which they are mounted takes place with the aid of the piezoelectric drive 23, in each case perpendicular to the plane of these elements or sides.

Figure 4:
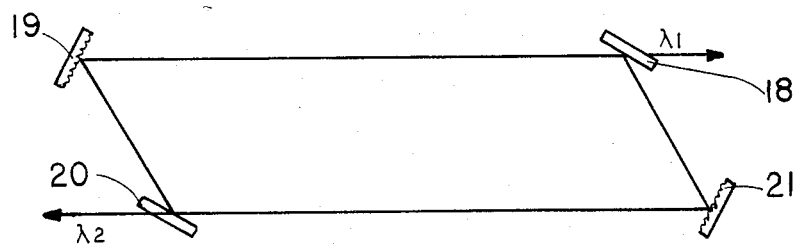
FIG. 4 shows a ring laser according to FIG. 1 with deviating means disposed at two different angles, causing a beam path in parallelogram form.

In the embodiment of FIG. 4, the beam path forms a parallelogram. This is due to the fact that only diagonally opposite mirrors 18 and 20 on the one hand, and 19 and 21 on the other hand, or their gratings, subtend the same angle of the beam. In this instance, two beams with different wavelengths $\lambda_1$ and $\lambda_2$ are coupled out by 80%-transmitting mirrors 18 and 20.

Figures 5A, 5B:
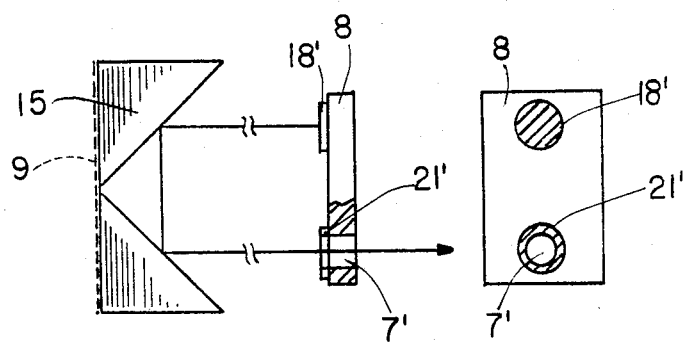
FIG. 5a shows a side view of the two endfaces of the housing (carrier plate and prism block) with mutually fixedly adjusted mirrors.
FIG. 5b shows the carrier plate of FIG. 5a in a top view.

FIGS. 5a and 5b show the endwalls 8 and 9 separately. They may be made of glass, glass-ceramic material, quartz, plastic, germanium, CdTe or zinc selenide. In the present example, the two mirrors 18' and 21' are fixed in their mutual relationship of surfaces. The mirror 18' is totally reflecting while the mirror 21' has an outer, partially transmitting region and a fully transparent center created by the hole 7'. Depending on the type of laser used, from 10 to 90% of the surface may be taken up by the opening. In another embodiment, not shown in the drawing, there is no hole; in that case, the "mirror" must be thought of as being transparent, with only low absorption. It would also be possible to make the entire endwall of transparent material and only cause total reflection at the desired location, for example, by vapor deposit of a layer of gold. The totally reflecting mirrors and the partially transmissive layers could also be imbedded in the wall. A plate so constructed may be used as a mode selector.

Figure 6:
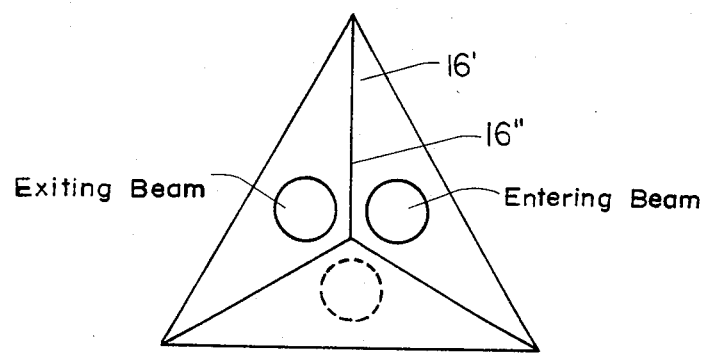
FIG. 6 shows an endface of the housing in which the totally reflecting mirrors have been replaced by a triple mirror.

In another embodiment, shown in FIG. 5a, the totally reflecting mirrors of the wall 9 may be replaced by a prism block 15 or, as shown in FIG. 6, by a triple mirror 16. The latter should be so placed in the beam that only its surface areas 16' are optically active, but not its ridges 16".

Figure 7:
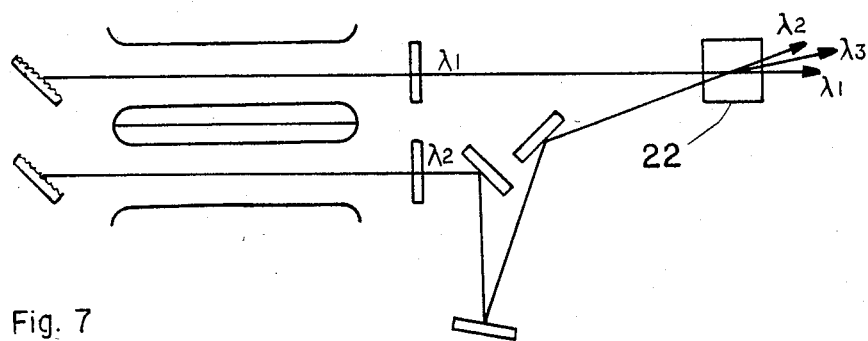
FIG. 7 shows a laser approximately according to FIG. 2, in which the extracted radiation of different wavelengths is passed through a germanium crystal.

As seen in FIG. 7, the radiation at the two wavelengths $\lambda_1$ and $\lambda_2$, coupled out as shown in FIG. 2, can be passed through a wavelength mixer 22, for example, a germanium crystal, and mixed to generate a new wavelength $\lambda_3 = 2\lambda_1 - \lambda_2$.

Figure 8:
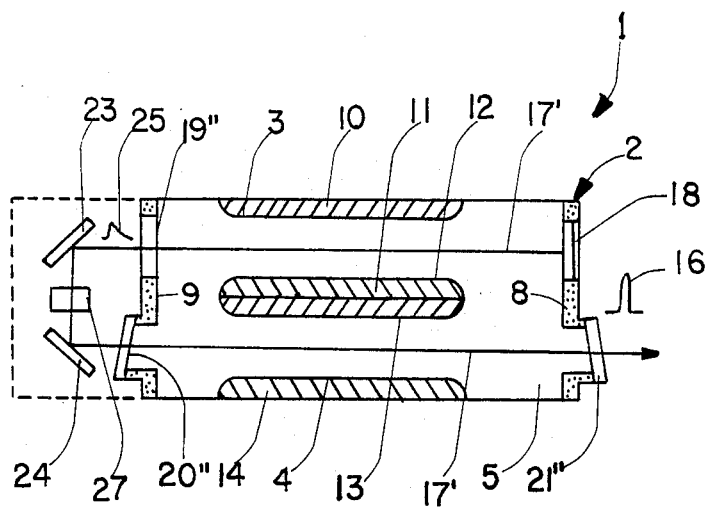
FIG. 8 is an apparatus according to the invention in which the reflecting and at least partially transmissive elements of the oscillator are inserted in the endfaces of the housing.

As shown in FIG. 8, the beam can be guided and shaped while being folded outside of the housing. As shown in dashed lines, this processing can also take place within the housing.

In this example, only a totally reflecting element, 18, for example a mirror, is fastened to, or inserted in the wall 8, while part of the wall 9 is replaced by an at least partially transmissive optical element 19", for example another suitably constructed mirror, or the wall is made transparent to the laser radiation at this location. Brewster angle windows 20" and 21" are inserted into the walls 8 and 9 between the electrodes 11 and 14.

In this arrangement, the laser beam 17' is fully reflected at the mirror 18 and then passes through the discharge channel formed by the electrodes 10 and 11, e.g., a laser oscillator. It is then coupled out at the other side and deviated by 90° at the mirror 23 which is positioned at a 45° angle with respect to the beam. The beam then enters the element 27 that processes the beam temporally or spatially. This is the preferred position for the element 27 but, in principle, it may be located anywhere in the beam path.

If it is necessary to incorporate an element 27 that influences the time behavior of the beam, also called a mode-locking element, that element may be an active or passive Q-switch. The active switch may have, as effective component, an electro-optical crystal of CdTe or an acousto-optical crystal, while the passive switch can contain a saturable absorber of Ge, $SF_6$ or hot $CO_2$. In the latter case, the crystal itself has the property of acting as an optical switch due to saturation absorption, while this effect is created by optical triggering in the former case. A laser spark gap may be used to trigger the electro-optical switch in order to change the transmission. If it is necessary to alter the spatial properties of the pulse, that means the laser pulse must be made wider or changed from a narrow to a broad shape. The beam can also be rotated or polarized or its phase fronts may be changed by adaptive optics. The deviating elements may also be adaptive mirrors.

After exiting from the element 27, the laser beam is again deviated by 90°, into the opposite direction of its original direction, by the mirror 24, also set at 45° relative to the beam. It passes through the Brewster angle window 20" in the end wall 9 into the channel formed by the electrodes 11 and 14, serving as an amplifier in the present example. At the other end, the laser beam is then extracted through the Brewster angle window 21" in the end wall 8, in the direction of the arrow.

Figure 9:
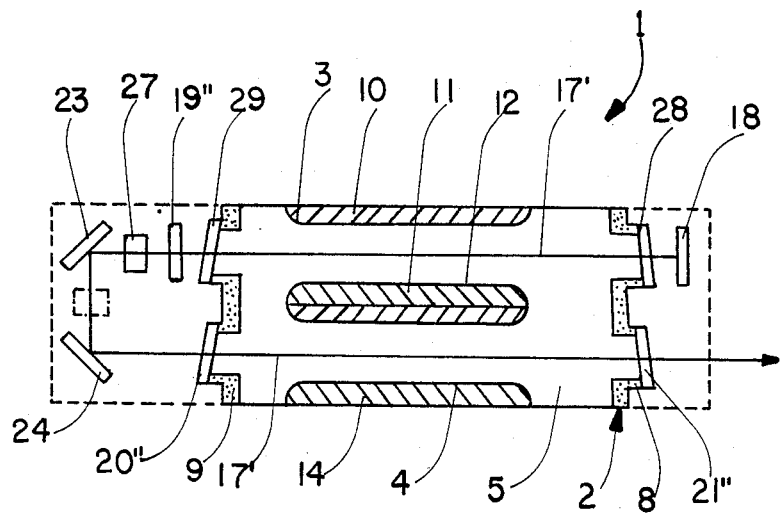
FIG. 9 is an apparatus as in FIG. 8, in which the reflecting and the at least partially transmissive window are disposed outside of the housing.

FIG. 9 differs from FIG. 8 mainly only in that the optical elements 18 and 19" in the side walls 8 and 9 are replaced by the Brewster angle windows 28 and 29. The optical elements 18 and 19" are disposed, in this example, outside of the housing 2, in each case directly adjacent the associated Brewster angle window 28, 29.

The construction of two, optically terminated, sequentially traversed channels and the intermediate switch 27 provides a simple method for (externally) processing a laser beam having a pulse shape 25, by temporal or spatial transformation. The amplifier channel then only amplifies that part of the laser beam which makes optimum use of the amplifier medium, thereby producing the output pulse shape 16 which has a leading slope that is substantially steeper than that of the original laser pulse produced in the oscillator channel.

We claim:
1. A laser system comprising:
 (a) a housing defining a resonator chamber having two opposite ends and sidewalls disposed between said ends;
 (b) an electrode system disposed within said housing, comprising:
  (i) a center electrode having first and second discharge surfaces for electrical discharge;
  (ii) a first outer electrode disposed in facing spaced relationship to said first discharge surface of said center electrode and
  (iii) a second outer electrode disposed in facing spaced relationship to said second discharge surface of said center electrode; and
 (c) at least four optical elements provided at the ends of said housing, and positioned, configured and dimensioned to form an optical loop, said first and second optical elements being positioned in line with a first channel formed between said first outer electrode and said first discharge surface of said center electrode, and said third and fourth optical elements being positioned in line with a second channel formed between said second outer electrode and said second discharge surface of said center electrode, wherein said optical elements are at least partially reflecting, two of said at least partially reflecting optical elements extracting beams with a wavelength which is a function of the position of said partially reflecting optical elements.

2. A laser system according to claim 1, wherein said optical elements are four in number and are positioned and disposed in such a manner that a beam produced within said resonator chamber is directed by each of said optical elements onto the next optical element in the sequential manner of a ring laser, the path of said beam defining a quadrilateral.

3. A laser system according to claim 1, wherein said optical elements are exchangeable and the optical surfaces of said optical elements are nonplanar.

4. A laser system according to claim 1, wherein said totally reflecting optical elements comprise prism blocks.

5. A laser system according to claim 4, wherein totally reflecting optical elements comprise a triple mirror which is so disposed that its surfaces are in the path of said beam and its ridges are not in the path of said beam.

6. A laser system according to claim 1, wherein said optical elements or said ends of said housing supporting said optical elements are displaceable by means of a piezoelectric drive.

7. A laser system according to claim 1, wherein said totally reflecting optical elements comprise triple mirrors.

8. A ring laser system for producing first and second beams of different wavelengths comprising:
(a) a housing defining a resonator chamber having two opposite ends and sidewalls disposed between said ends;
(b) an electrode system disposed within said housing, comprising:
  (i) a center electrode having first and second discharge surfaces for electrical discharge;
  (ii) a first outer electrode disposed in facing spaced relationship to said first discharge of said center electrode; and
  (iii) a second outer electrode disposed in facing spaced relationship to said second discharge surface of said center electrode, and
(c) at least four optical elements provided at the ends of said housing, and positioned, configured and dimensioned to form an optical loop, said first and second optical elements being positioned in line with a first channel formed between said first outer electrode and said first discharge surface of said center electrode, and said third and fourth optical elements being positioned in line with a second channel formed between said second outer electrode and said second discharge surface of said center electrode, said first beam having a first wavelength and said second beam having a second wavelength, and said second and third optical elements being totally reflective and rotatable about an axis perpendicular to the main plane of said system to select the wavelengths of said first and second beams, and said first and fourth optical elements are at least partially transmitting and translatable along the longitudinal axis of said system, said second and third optical elements reflecting said first and second beams, respectively, and said first and fourth optical elements transmitting and extracting said first and second beams, respectively.

9. A laser system according to claim 8, wherein said second optical element comprises a first diffraction grating with a first grating constant, and said third optical element comprises a second diffraction grating with a second diffraction constant, said first and second grating constants being unequal.

10. A laser system according to claim 9, wherein said optical elements are incorporated as carrier plates into the ends of said housing.

11. A laser system according to claim 10, wherein the first of said carrier plates comprises a totally reflecting region and a sufficiently transmitting region, and said first carrier plate functions as a mode selector as a result of limiting said totally reflecting region.

12. A laser system for producing first and second beams of different wavelengths comprising:
(a) a housing defining a resonator chamber having two opposite ends and sidewalls disposed between said ends;
(b) an electrode system disposed within said housing, compr.
  (i) a center electrode having first and second discharge surfaces for electrical discharge;
  (ii) a first outer electrode disposed in facing spaced relationship to said first discharge surface of said center electrode; and
  (iii) a second outer electrode disposed in facing spaced relationship to said second discharge surface of said center electrode;
(c) at least four optical elements provided at the ends of said housing, and positioned configured and dimensioned to form an optical loop, said first and second optical elements being positioned in line with a first channel formed between said first outer electrode and said first discharge surface of said center electrode, and said third and fourth optical elements being positioned in line with a second channel formed between said second outer electrode and said second discharge surface of said center electrode, wherein said optical elements are at least partially reflecting, two of said at least partially reflecting optical elements extracting first and second beams of different wavelengths which are a function of the optical properties of said second and third optical elements, said first beam having a first wavelength and said second beam having a second wavelength; and
(d) a wavelength mixer comprising an optical crystal placed in the path of said first and second beams producing a third beam having a third wavelength, said third wavelength not equaling either said first or said second wavelengths.

13. A laser system, comprising:
(a) a housing defining a resonator having two opposite ends and sidewalls disposed between said ends;
(b) an electrode system disposed within said housing, comprising:
  (i) a center electrode having first and second discharge surfaces for electrical discharge;
  (ii) a first outer electrode disposed in facing spaced relationship to said first discharge surface of said center electrode; and
  (iii) a second outer electrode disposed in facing spaced relationship to said second discharge surface of said center electrode;
(c) at least four optical elements provided at the ends of said housing and positioned configured and dimensioned to form an optical loop; said first and second optical elements being positioned in line with a first channel formed between said first outer electrode and said first discharge surface of said center electrode, and said third and fourth optical elements being positioned in line with a second channel formed between said second outer electrode and said second discharge surface of said center electrode, wherein said optical elements are at least partially reflecting, two of said at least partially reflecting optical elements extracting beams with different wavelengths; and
(d) pulse shaping means positioned in said optical loop for changing the shape of a pulse produced by the system.

14. A laser system according to claim 13, wherein said processing element is located along the path traveled by said beam after leaving said first channel and before entering said second channel.

15. A laser system according to claim 13, wherein said first channel acts as an optically closed laser oscillator with an unstable resonator and said second channel acts as a laser amplifier with an injection laser.

16. A laser system according to claim 15, wherein said oscillator and amplifier operate at different pressures, temperatures, and gas mixtures, makes it possible to carry out the pumping process at arbitrary times and mutually independent of each other.

17. A laser system according to claim 13, wherein said ends of said housing comprise Brewster angle windows and/or a totally reflecting and an at least partially transmitting optical element at the level of said first channel, and Brewster angle windows at the level of said second channel.

18. A laser system according to claim 13, wherein said processing element is an active or passive optical Q-switch.

19. A laser system according to claim 18, wherein said active optical switch comprises an electro-optical or acousto-optical crystal, and said passive optical switch comprises a saturable absorber.

20. A laser system according to claim 13, wherein adaptive optics are used to alter the phase fronts and said processing element comprises enlarging, focusing, rotating, or polarizing means for spatially influencing the pulse shape of said beam.

* * * * *